United States Patent Office 3,207,825
Patented Sept. 21, 1965

3,207,825
PROCESS FOR EXTRUDING POLYTETRAFLUORO-ETHYLENE-SILICONE RUBBER COMPOSITION
Paul R. Tully, Lowell, Mass., assignor to General Electric Company, a corporation of New York
No Drawing. Filed July 20, 1961, Ser. No. 125,356
2 Claims. (Cl. 264—127)

This invention relates to an improved extrusion process. More particularly, the invention relates to the extrusion of a polytetrafluoroethylene composition modified by the presence of silicone rubber.

A polytetrafluoroethylene extrusion composition was disclosed in Llewellyn et al. Patent No. 2,685,707. In accordance with this patent, colloidal-sized particles of polytetrafluoroethylene coagulated from an aqueous colloidal suspension of the polymer are mixed with an organic lubricant having a viscosity of at least 0.45 centipoise at 25° C., the lubricant being liquid under the conditions of subsequent extrusion and present in an amount equal to from 5% to 50% based upon the combined weight of the polytetrafluoroethylene and lubricant, to obtain a dry, uniform, pressure-coalescing mixture. The mixture is then passed through a die at a temperature of 15° C. to 150° C. under compacting pressure and the resulting product is baked at a temperature above the sintering temperature of the polymer until sintered. Preferably, substantially all of the lubricant is removed from the mixture before the temperature of the polymer reaches the sintering temperature.

Polytetrafluoroethylene is at best a difficult material to extrude. The process for extruding thin wall tubing on thin wires with the polytetrafluoroethylene extrusion composition as described above produces an article which is apt to have at least one electrical defect every few hundred feet. Since the wire is used in critical applications where it must be fault-free, standard manufacturing techniques provide for complete testing of wire and severing it wherever a defect occurs. This produces fault-free wire but the lengths vary, some being as short as ten feet. Rarely is a length of more than 500 feet produced. Furthermore, it is well known that the life of wires insulated with polytetrafluoroethylene is significantly curtailed in the presence of corona discharge at high voltages.

Another object of the present invention is to provide for the extrusion of a polytetrafluoroethylene extrusion composition containing an additive which is cured upon heating the extruded composition.

Other objects of the invention will become appareent from the following specification. Briefly stated, in accordance with one of its aspects, the invention is directed to an extruded polytetrafluoroethylene composition comprising 0.6% to 12.5% by weight of cured silicone rubber, the balance comprising coagulated aqueous colloidal polytetrafluoroethylene suspension which has been sintered.

The polytetrafluoroethylene used in this invention and described in the patent to Llewellyn et al. is sold by E. I. du Pont de Nemours & Co., Wilmington, Delaware, under the designation "Teflon 6." As described in Bulletin No. X-93 of the Du Pont Company, "Teflon 6" is capable of undergoing large plastic deformations when subjected to moderate stresses. When compounded with an organic lubricant, such as naphtha or white oil, and forced through a restricting die, the individual particles are deformed into a compact fibrous structure. The term polytetrafluoroethylene should be understood as it applies to this invention as being a number of types of polymers such as tetrafluoroethylene homopolymers, tetrafluoroethylene copolymers comprising the polymerization product of a mixture of tetrafluoroethylene and some other unsaturated organic compound such as ethylene and chlorotrifluoroethylene, and also tetrafluoroethylene polymers in which the end groups of the polymer chain are supplied by non-polymerizable compounds such as methanol and ethanol.

In accordance with the present invention, the polytetrafluoroethylene has mixed with it from 0.6% to 12.5% by weight (of the polytetrafluoroethylene) of silicone rubber containing a curing agent. Silicone rubbers are organopolysiloxanes which are heat curable to a rubber-like consistency in the presence of certain curing agents. While silicone rubbers generally are satisfactory for use in the present invention, the more desirable silicone rubbers are those which cure at low temperatures. These are the silicone rubbers which can be cured quickly by the application of heat. It is desired to effect the cure of the silicone rubber as quickly as possible after it has been extruded upon wire so that the silicone rubber is cured during the time required to volatilize the lubricant and sinter the polytetrafluoroethylene. Other materials may be added to the extrusion composition for the purpose of color or reinforcement. Examples of such materials include silica, asbestos, talc, mica, graphite, inorganic pigments, etc.

Silicone rubbers which are particularly useful in the present invention are those described in Berridge Patent No. 2,843,555 which describes an organopolysiloxane composition convertible at temperatures ranging from about 20°–40° C. to the cured, solid, elastic state. Such a composition comprises (a) a linear, fluid organopolysiloxane containing terminal silicon-bonded hydroxy groups and having an average of about two organic groups per silicon atom, (b) an alkyl silicate, and (c) a metallic salt of an organic carboxylic acid in which the metallic ion is selected from the class consisting of lead, tin, zirconium, antimony, iron, cadmium, barium, calcium, titanium, bismuth, and manganese. Silicone rubbers manufactured in accordance with the Berridge patent are sold by the General Electric Company under the designation "RTV" which stands for "room temperature vulcanizing."

The following examples are given by way of illustrating the invention and are not to be taken as limiting.

EXAMPLE 1

Polytetrafluoroethylene (Teflon 6C) (540 grams) was worked in a tumbling mill for 20 minutes with silicone rubber (RTV 11) (20 grams) to which .20 gram of di-butyl tin dilaurate (Thermolite 12) curing agent had been added along with 98 grams of naphtha. The mix was then blended by a 20-minute roll on a rolling mill. At the end of this time the mixture had a pasty consistency and it was placed into a preform tube and compressed to form a billet for extrusion.

The silicone rubber modified polytetrafluoroethylene billet was extruded by means of conventional equipment. After extrusion, the wire was subjected to heat treatment to volatilize the naphtha, cure the silicone rubber, and sinter the polytetrafluoroethylene.

The silicone rubber principally serves to fill the voids created as the naphtha is volatilized thus rendering a composition which has outstanding electrical properties.

EXAMPLE 2

The procedure of Example 1 was repeated except that only 3¼ grams of silicone rubber were added along with .03 gram of curing agent and 114 grams of naphtha. The resulting compound did not extrude as readily as the compound of Example 1. The final product did not have as good electrical properties and had more defects per unit of length. Nevertheless, it was dielectrically superior to a polytetrafluoroethylene-insulated wire which contained no silicone rubber.

EXAMPLE 3

The procedure of Example 1 was followed except that 67½ grams of silicone rubber and .70 gram of curing agent were present and 50 grams of white oil. The compound extruded very readily and wire insulated with the material had relatively few defects. However, these good results were obtained at the expense of lowering some of the other electrical properties of the wire (i.e. power factor and specific inductance capacitance).

By far the greatest advantage that the polytetrafluoroethylene-silicone rubber composition offers is improved electrical characteristics of the finished wire. Production runs resulted in fewer electrical failures resulting in longer lengths of fault-free wires. Laboratory corona resistance tests prove that the average voltage failure as applied for one minute in water occurs at 4000 volts for a 0.010″ wall of polytetrafluoroethylene and 6000 volts for a 0.010″ wall of polytetrafluoroethylene-silicone rubber insulation. Samples of polytetrafluoroethylene insulated wires and polytetrafluoroethylene-silicone rubber composition insulated wires were immersed in water and a potentional of 3000 volts was supplied between the conductor and the water until failure occurred. It was found that the average life expectancy of the polytetrafluoroethylene-silicone rubber composition was twenty times greater than that of the polytetrafluoroethylene insulation.

Radiation resistance is an important property of the high-temperature wire insulation of the present invention. The improvement brought about by the addition of silicone rubber to polytetrafluoroethylene as opposed to straight polytetrafluoroethylene is well illustrated in the following Table I:

*Table I*

AVERAGE DIELECTRIC STRENGTH STRAIGHT POLYTETRAFLUOROETHYLENE INSULATION VS. POLYTETRAFLUOROETHYLENE-SILICONE RUBBER INSULATION APPLIED TO SIZE 20 AWG WIRE

|  | Straight polytetrafluoroethylene | Polytetrafluoroethylene silicone rubber |
|---|---|---|
| Samples before exposure, kv | 6.7 | 12.5 |
| Samples after exposure to 5.7×10⁶ Roentgens dosage, kv | 1.5 | 8.9 |
| Samples after exposure to 50×10⁶ Roentgens dosage, kv | (¹) | 10.4 |

¹ Insulation cracked complete mechanical and electrical failures.

While the invention has been described with reference to certain specific embodiments thereof, it is obvious that there can be variations which fall within the true spirit of the invention. Therefore, the invention should be limited in scope only as may be necessitated by the scope of the appended claims.

What I claim as new and desire to secured by Letters Patent of the United States is:

1. The method of extruding a polytetrafluoroethylene composition which comprises intimately admixing a coagulated aqueous colloidal polytetrafluoroethylene suspension with 0.5% to 10% by weight of a heat curable silicone rubber composition, and 12% to 20% by weight of an organic lubricant, pressure-forming said mixture into an extrudable preform, extruding said mixture, and heating said extruded mixture to evaporate said lubricant, cure said organopolysiloxane, and sinter the polytetrafluoroethylene.

2. The method of manufacturing high-temperature wire which comprises admixing a coagulated suspension of aqueous colloidal polytetrafluoroethylene with 0.5% to 10% by weight of a heat curable silicone rubber composition, and 12% to 20% by weight of an organic lubricant, pressure-forming said mixture into an extrudable preform, extruding said mixture onto a conductor, and heating said conductor and extruded coating to cure said organopolysiloxane, volatilize said lubricant, and sinter the polytetrafluoroethylene.

References Cited by the Examiner

UNITED STATES PATENTS

| 2,419,095 | 4/47 | Stevens | 174—110 |
| 2,802,897 | 8/57 | Hurd et al. | 174—110 |
| 2,485,691 | 10/49 | Bogese | 18—59 |
| 2,586,357 | 2/52 | Llewellyn | 260—33.6 |
| 2,644,802 | 7/53 | Lontz | 260—29.1 |
| 2,990,582 | 7/61 | Tully et al. | 18—59 |

FOREIGN PATENTS 823,603   11/59   Great Britain.

OTHER REFERENCES

"Teflon 6—Paste Extrusion of Wire Insulation," Du Pont Information Bulletin No. X–93, Wilmington, Delaware, October 1957, 10 pages.

ALEXANDER H. BRODMERKEL, *Primary Examiner.*

WILLIAM J. STEPHENSON, MORRIS LIEBMAN,
*Examiners.*